(12) United States Patent
Friedel

(10) Patent No.: US 9,900,343 B1
(45) Date of Patent: Feb. 20, 2018

(54) DISTRIBUTED DENIAL OF SERVICE CELLULAR SIGNALING

(71) Applicant: A10 Networks, Inc., San Jose, CA (US)

(72) Inventor: Michael Friedel, Alexandria, VA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

(21) Appl. No.: 14/589,828

(22) Filed: Jan. 5, 2015

(51) Int. Cl.
*G06F 11/00* (2006.01)
*H04L 29/06* (2006.01)

(52) U.S. Cl.
CPC .................. *H04L 63/1458* (2013.01)

(58) Field of Classification Search
CPC ................................. H04L 63/1458
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,511,122 A | 4/1996 | Atkinson |
| 5,584,023 A | 12/1996 | Hsu |
| 5,684,875 A | 11/1997 | Ellenberger |
| 5,757,908 A | 5/1998 | Cooper et al. |

(Continued)

FOREIGN PATENT DOCUMENTS

| | | |
|---|---|---|
| TW | 477140 | 2/2002 |
| TW | 574655 | 2/2004 |

(Continued)

OTHER PUBLICATIONS

Steffen Liebergeld et al., "Cellpot: A Concept for Next Generation Cellular Network Honeypots," Internet Society, Feb. 23, 2014, pp. 1-6.*

(Continued)

*Primary Examiner* — Luu Pham
*Assistant Examiner* — Canh Le
(74) *Attorney, Agent, or Firm* — AMPACC Law Group, LLP; Keith Kline

(57) ABSTRACT

Disclosed are methods and systems for providing a mobile signaling channel during a distributed denial of service (DDoS) attack. An example method for providing a mobile signaling channel during a DDoS attack may include communicatively coupling a mobile device to a DDoS device protecting upstream data communications during the DDoS attack. The mobile device may be operable to signal the DDoS attack via the mobile signaling channel. Furthermore, the method may include determining that a capacity of a primary signaling channel associated with the DDoS device is below a predetermined threshold capacity. The method may further include activating signaling of the DDoS attack by the mobile device via the mobile signaling channel. The activation may be performed based on the determination that the capacity of the primary signaling channel associated with the DDoS device is below the predetermined threshold capacity.

16 Claims, 5 Drawing Sheets

(56) References Cited

U.S. PATENT DOCUMENTS

| | | |
|---|---|---|
| 5,805,801 A | 9/1998 | Holloway et al. |
| 5,835,727 A | 11/1998 | Wong et al. |
| 5,892,903 A | 4/1999 | Klaus |
| 5,905,859 A | 5/1999 | Holloway et al. |
| 5,940,002 A | 8/1999 | Finn et al. |
| 5,960,177 A | 9/1999 | Tanno |
| 6,006,272 A | 12/1999 | Aravamudan et al. |
| 6,170,061 B1 | 1/2001 | Beser |
| 6,185,681 B1 | 2/2001 | Zizzi |
| 6,205,115 B1 | 3/2001 | Ikebe et al. |
| 6,219,706 B1 | 4/2001 | Fan et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,539,435 B2 | 3/2003 | Bolmarcich et al. |
| 6,553,005 B1 | 4/2003 | Skirmont et al. |
| 6,578,147 B1 | 6/2003 | Shanklin et al. |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,973,040 B1 | 12/2005 | Ricciulli |
| 6,988,106 B2 | 1/2006 | Enderwick et al. |
| 7,092,357 B1 | 8/2006 | Ye |
| 7,194,766 B2 | 3/2007 | Noehring et al. |
| 7,200,760 B2 | 4/2007 | Riebe et al. |
| 7,221,757 B2 | 5/2007 | Alao |
| 7,234,161 B1 | 6/2007 | Maufer et al. |
| 7,277,963 B2 | 10/2007 | Dolson et al. |
| 7,372,809 B2 | 5/2008 | Chen et al. |
| 7,392,241 B2 | 6/2008 | Lin et al. |
| 7,409,712 B1 | 8/2008 | Brooks et al. |
| 7,418,733 B2 | 8/2008 | Connary et al. |
| 7,478,429 B2 | 1/2009 | Lyon |
| 7,533,409 B2 | 5/2009 | Keane et al. |
| 7,543,052 B1 | 6/2009 | Cesa Klein |
| 7,577,833 B2 | 8/2009 | Lai |
| 7,596,695 B2 | 9/2009 | Liao et al. |
| 7,620,733 B1 | 11/2009 | Tzakikario et al. |
| 7,665,138 B2 | 2/2010 | Song et al. |
| 7,739,494 B1 | 6/2010 | McCorkendale et al. |
| 7,823,194 B2 | 10/2010 | Shay |
| 7,845,004 B2 | 11/2010 | Bardsley et al. |
| 7,925,766 B2 | 4/2011 | Jayawardena et al. |
| 7,953,855 B2 | 5/2011 | Jayawardena et al. |
| 8,010,469 B2 | 8/2011 | Kapoor et al. |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,375,453 B2 | 2/2013 | Jackson et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,130,996 B1 | 9/2015 | Martini |
| 9,215,208 B2 | 12/2015 | Fraize et al. |
| 9,245,121 B1 | 1/2016 | Luo et al. |
| 9,246,926 B2 | 1/2016 | Erlingsson et al. |
| 9,294,503 B2 | 3/2016 | Thompson et al. |
| 9,300,623 B1 | 3/2016 | Earl et al. |
| 9,537,886 B1 | 1/2017 | Gareau |
| 9,571,465 B1 | 2/2017 | Sharifi Mehr et al. |
| 9,584,318 B1 | 2/2017 | Yang et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0023876 A1 | 1/2003 | Bardsley et al. |
| 2003/0028585 A1 | 2/2003 | Yeager et al. |
| 2003/0035547 A1 | 2/2003 | Newton |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0148520 A1 | 7/2004 | Talpade et al. |
| 2004/0172538 A1 | 9/2004 | Satoh et al. |
| 2004/0187032 A1 | 9/2004 | Gels et al. |
| 2005/0021999 A1 | 1/2005 | Touitou et al. |
| 2005/0041584 A1 | 2/2005 | Lau et al. |
| 2005/0044068 A1 | 2/2005 | Lin et al. |
| 2005/0044352 A1 | 2/2005 | Pazi et al. |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0179319 A1 | 8/2006 | Krawczyk |
| 2006/0185014 A1 | 8/2006 | Spatscheck et al. |
| 2006/0230444 A1 | 10/2006 | Iloglu et al. |
| 2006/0265585 A1 | 11/2006 | Lai |
| 2007/0143769 A1* | 6/2007 | Bu .................... H04L 63/1408 |
| | | 719/313 |
| 2007/0157027 A1 | 7/2007 | Palekar et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0283429 A1 | 12/2007 | Chen et al. |
| 2008/0183885 A1 | 7/2008 | Durrey et al. |
| 2008/0256623 A1 | 10/2008 | Worley et al. |
| 2009/0077663 A1 | 3/2009 | Sun et al. |
| 2009/0083537 A1 | 3/2009 | Larsen et al. |
| 2009/0168995 A1 | 7/2009 | Banga et al. |
| 2010/0131646 A1 | 5/2010 | Drako |
| 2010/0138921 A1 | 6/2010 | Na et al. |
| 2010/0284300 A1 | 11/2010 | Deshpande et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0138177 A1 | 6/2011 | Qiu et al. |
| 2011/0153744 A1 | 6/2011 | Brown |
| 2011/0188452 A1* | 8/2011 | Borleske ............... G01D 4/004 |
| | | 370/328 |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0144461 A1 | 6/2012 | Rathbun |

(56) References Cited

U.S. PATENT DOCUMENTS

| | | | |
|---|---|---|---|
| 2012/0155274 A1* | 6/2012 | Wang | H04L 63/1458 370/236 |
| 2012/0159623 A1 | 6/2012 | Choi | |
| 2012/0163186 A1 | 6/2012 | Wei et al. | |
| 2012/0170753 A1 | 7/2012 | Pandrangi et al. | |
| 2012/0173684 A1 | 7/2012 | Courtney et al. | |
| 2012/0174196 A1 | 7/2012 | Bhogavilli et al. | |
| 2012/0227109 A1 | 9/2012 | Dimuro | |
| 2012/0250866 A1 | 10/2012 | Matsuo | |
| 2012/0260329 A1 | 10/2012 | Suffling | |
| 2012/0266242 A1* | 10/2012 | Yang | H04L 63/1458 726/23 |
| 2013/0019025 A1 | 1/2013 | Chaturvedi et al. | |
| 2013/0103834 A1 | 4/2013 | Dzerve et al. | |
| 2013/0139245 A1 | 5/2013 | Thomas | |
| 2013/0198845 A1* | 8/2013 | Anvari | G06F 21/85 726/25 |
| 2013/0212265 A1 | 8/2013 | Rubio Vidales et al. | |
| 2013/0227646 A1 | 8/2013 | Haggerty et al. | |
| 2013/0243194 A1 | 9/2013 | Hawkes et al. | |
| 2013/0263256 A1 | 10/2013 | Dickinson et al. | |
| 2014/0137190 A1 | 5/2014 | Carey et al. | |
| 2014/0269308 A1 | 9/2014 | Oshiba | |
| 2014/0280832 A1 | 9/2014 | Oshiba | |
| 2014/0325588 A1 | 10/2014 | Jalan et al. | |
| 2014/0325648 A1 | 10/2014 | Liu et al. | |
| 2014/0344925 A1 | 11/2014 | Muthiah | |
| 2015/0033341 A1 | 1/2015 | Schmidtler et al. | |
| 2015/0058977 A1 | 2/2015 | Thompson et al. | |
| 2015/0143118 A1 | 5/2015 | Sheller et al. | |
| 2015/0220745 A1 | 8/2015 | Nellitheertha et al. | |
| 2015/0281177 A1 | 10/2015 | Sun | |
| 2015/0326685 A1 | 11/2015 | Erickson | |
| 2015/0381585 A1 | 12/2015 | Vaterlaus et al. | |
| 2016/0036651 A1 | 2/2016 | Sureshchandra et al. | |
| 2016/0134655 A1 | 5/2016 | Thompson et al. | |
| 2016/0182509 A1 | 6/2016 | Kantecki et al. | |
| 2016/0226896 A1 | 8/2016 | Bhogavilli et al. | |
| 2016/0344836 A1 | 11/2016 | Erickson | |

FOREIGN PATENT DOCUMENTS

| | | |
|---|---|---|
| TW | NI197237 | 2/2004 |
| TW | I225999 | 1/2005 |
| TW | I241818 | 10/2005 |
| TW | I252976 | 4/2006 |
| WO | WO1998042108 | 9/1998 |
| WO | WO1999048303 A2 | 9/1999 |
| WO | WO2000062167 A1 | 10/2000 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

Patrick P. C. Lee, et al. "On the Detection of Signaling Dos Attack on 3G Wireless Networks," IEEE INFOCOM 2007 processings.*

Huangxin Wang et al., "A Moving target DDos defense mechanism," Computer Communications, 2014, pp. 10-21.*

Valer Bocan et al., "Threats and Countermeasures in GSM Networks," Journal of Networks, vol. 1, No. 6, Nov./Dec. 2006, pp. 18-27.*

Oracle Corporation. Oracle Intelligent Agent User's Guide, Release 9.2.0, Part No. A96676-01. Mar. 2002.

SOL11243. iRules containing the RULE_INIT iRule event do not re-initialize when a syntax error is corrected. f5.support.com. May 24, 2010.

Mutz, "Linux Encryption How to," available at http://encryptionhowto.sourceforge.net/Encryption-HOWTO-1.html, Oct. 4, 2000

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerlS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Spatscheck et al., "Optimizing TCP Forwarder Performance", IEEE/ACM Transactions on Networking, vol. 8, No. 2, Apr. 2000, pp. 146-157.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retrieved from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retrieved from the Internet: <URL:http://www.unizh.ch/home/mazzo/reports/www7conf/fullpapers/1899/com1899.htm>, 14 pages.

* cited by examiner

DISTRIBUTED DENIAL OF SERVICE CELLULAR SIGNALING

TECHNICAL FIELD

This disclosure relates generally to computer and network security and, more specifically, to cellular signaling of distributed denial of service (DDoS) attacks.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

A DDoS attack is an attempt to make a network machine or network resource unavailable to intended users. Generally speaking, DDoS attacks are an attempt to overwhelm the capacity of a network device or a service in order to interrupt or suspend functioning of network resources associated with the service. The DDoS attacks are a prevalent and ever-increasing threat and every Internet-based business or website is at potential risk.

Traditional methods for detecting and signaling DDoS attacks include monitoring incoming traffic and determining that a DDoS attack is under way based on an observation of a large increase in traffic originating from a large number of machines, each having a distinct Internet Protocol (IP) address. Mitigating the DDoS attack can include distinguishing incoming traffic associated with the DDoS attack from legitimate traffic and blocking the DDoS traffic.

However, when a protecting device, such as, for example, a DDoS device protecting a network upstream interface, is overwhelmed with the incoming DDoS traffic, it may become difficult or even impossible to send out a request for help. For example, if a network having a 10-gigabyte link is attacked by 100 gigabytes of DDoS traffic, a DDoS device may not be able to signal to another DDoS device or a network administrator that the DDoS attack is in progress.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for providing a mobile signaling channel during a DDoS attack. Specifically, a method for providing a mobile signaling channel during a DDoS attack may include communicatively coupling a mobile device to a DDoS device protecting upstream data communications during the DDoS attack. The mobile device may be operable to signal the DDoS attack via the mobile signaling channel. Furthermore, the method may include determining that a capacity of a primary signaling channel associated with the DDoS device is below a predetermined threshold capacity. The method may further include activating signaling of the DDoS attack by the mobile device via the mobile signaling channel. The activation may be performed based on the determination that the capacity of the primary signaling channel associated with the DDoS device is below the predetermined threshold capacity.

According to another approach of the present disclosure, there is provided a system for providing a mobile signaling channel during a DDoS attack. The system may comprise at least one processor. The processor may be communicatively coupling a mobile device to a DDoS device protecting upstream data communications during the DDoS attack. The mobile device may be operable to signal the DDoS attack via the mobile signaling channel. The processor may be further operable to determine that a capacity of a primary signaling channel associated with the DDoS device is below a predetermined threshold capacity. Based on the determination, the processor may activate signaling of the DDoS attack by the mobile device via the mobile signaling channel. The system for providing a mobile signaling channel during a DDoS attack may further comprise a database in communication with the at least one processor. The database may include computer-readable instructions for execution by the at least one processor.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings.

DETAILED DESCRIPTION

Figure 1:
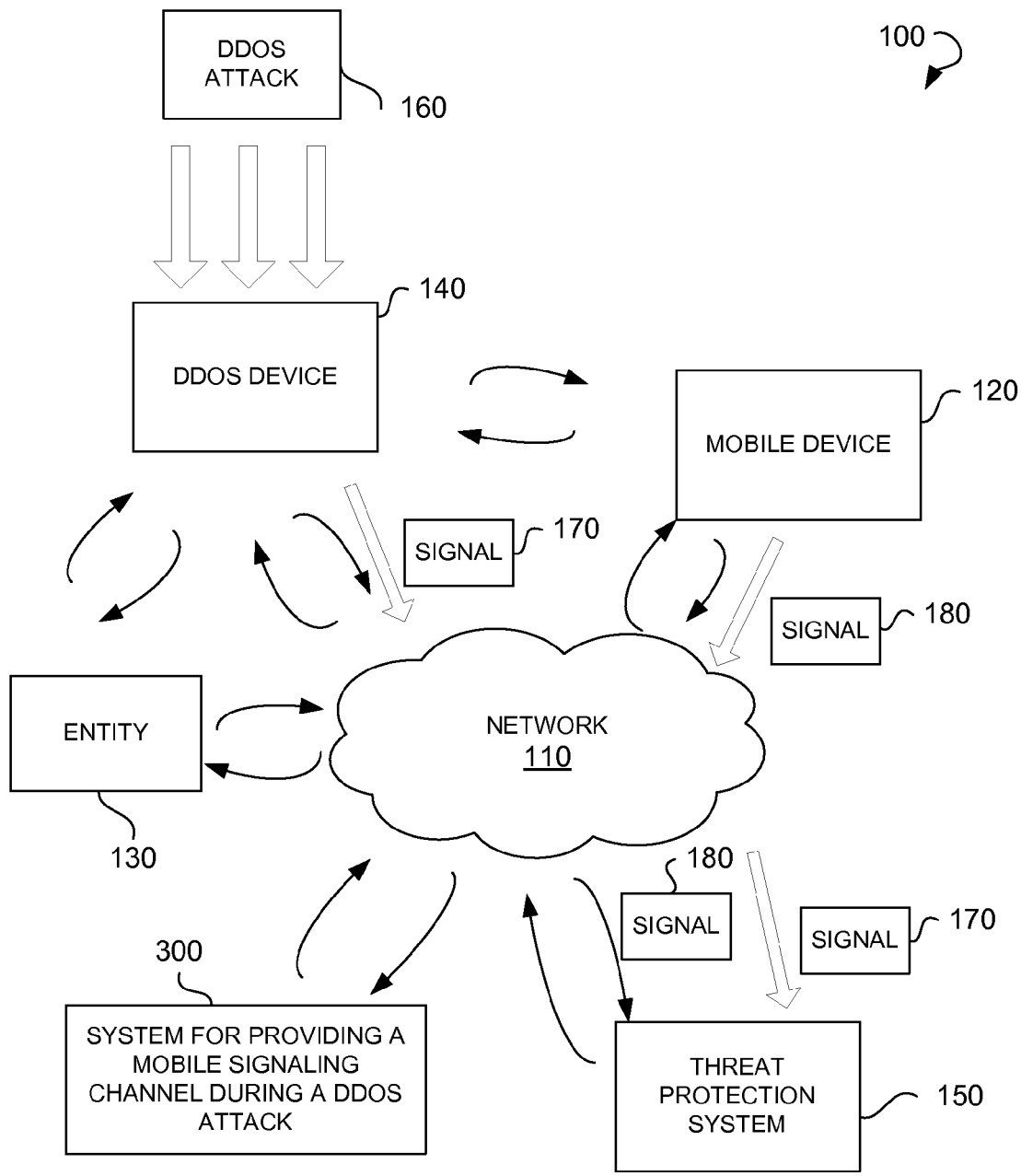
FIG. 1 shows an environment within which method and systems for providing a mobile signaling channel during a DDoS attack can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Embodiments of the disclosure described herein may be implemented using a variety of technologies. For example, various methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure relate to providing a mobile signaling channel during a DDoS attack. As used herein, "a DDoS attack" may refer to an event of DDoS attack on a network device or a service.

A system for providing a mobile signaling channel during a DDoS attack may be responsible for signaling a DDoS attack on a network machine or a network resource. The system for providing a mobile signaling channel during a DDoS attack may include a DDoS device that may protect upstream data communications during the DDoS attack. In other words, the DDoS device may send a notification that the DDoS attack is in progress to a threat protection system (TPS), for example. The TPS may be operable to mitigate the DDoS attack.

The system for providing a mobile signaling channel during a DDoS attack may utilize a primary signaling channel for sending a notification concerning a DDoS attack. The DDoS device may use the primary signaling channel for signaling the DDoS attack. The primary signaling channel may have a certain throughput capacity, i.e., the primary signaling channel may pass through a predetermined volume of data packets per unit of time. If the throughput capacity of the primary signaling channel is below a predetermined threshold capacity, the system for providing a mobile signaling channel may activate a secondary signaling channel. Specifically, the secondary signaling channel may be provided using a mobile device. The mobile device may be communicatively coupled to the DDoS device. If the primary signaling channel of the DDoS device is unavailable, the mobile device may signal the DDoS using a mobile signaling channel. Thus, signaling by the mobile device may be used as a backend signaling method if the primary signaling channel is unavailable.

Referring now to the drawings, FIG. 1 illustrates an environment 100 within which methods and systems for providing a mobile signaling channel during a DDoS attack can be implemented. The environment 100 may include a network 110, a mobile device 120, an entity 130, a DDoS device 140 associated with the entity 130, a system 300 for providing a mobile signaling channel during a DDoS attack, and a TPS 150. The DDoS device 140 may be communicatively coupled to the entity 130 and may be responsible for signaling of a DDoS attack 160 on the entity 130. The entity 130 may include a network machine or a network resource that is in need of protection from a DDoS attack 160.

The DDoS device 140 may be configured as an intrusion detection system that monitors network or system activities for malicious activities or policy violations, logs information about malicious activities or policy violations, and produces reports. More specifically, the DDoS device 140 can send an alarm to the system 300 to inform the system 300 about the DDoS attack 160 in progress.

The network 110 may include the Internet or any other network capable of communicating data between devices. Suitable networks may include or interface with any one or more of, for instance, a local intranet, a Personal Area Network, a LAN (Local Area Network), a WAN (Wide Area Network), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 110 may include a network of data processing nodes that are interconnected for the purpose of data communication.

During the DDoS attack 160, the DDoS device 140 may send a signal 170 informing the TPS 150 about the DDoS attack 160. If the DDoS device 140 is no longer able to signal the DDoS attack 160, the system 300 for providing a mobile signaling channel during a DDoS attack can activate the mobile device 120. The mobile device 120 may send a signal 180 informing the TPS 150 about the DDoS attack 160. The TPS 150 may perform DDoS mitigation steps in response to either the signal 170 or the signal 180.

Figure 2:
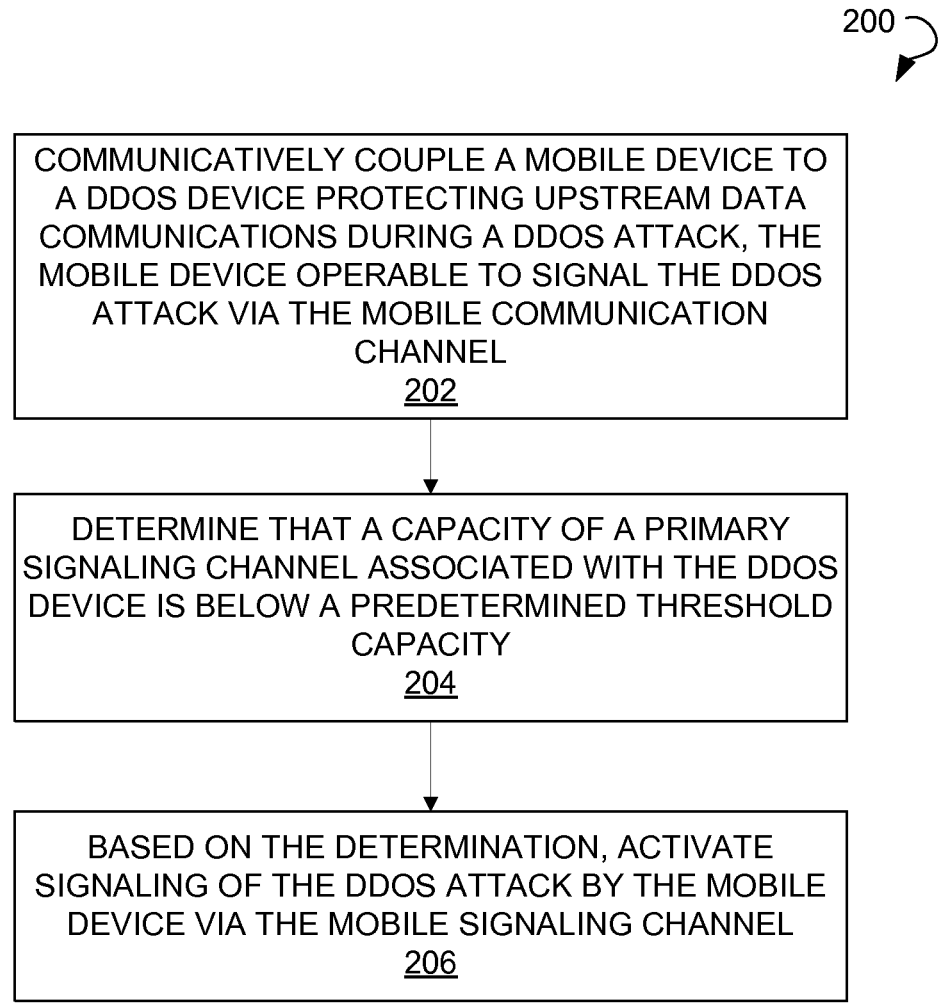
FIG. 2 is a process flow diagram illustrating a method for providing a mobile signaling channel during a DDoS attack.

FIG. 2 is a process flow diagram showing a method 200 for providing a mobile signaling channel during a DDoS attack, according to an example embodiment. In some embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence with communicatively coupling a mobile device to a DDoS device at operation 202. In an example embodiment, the mobile device is communicatively coupled to the DDoS device through at least one of the following: a wireless connection, a USB connection, a Peripheral Component Interconnect (PCI) connection, and so forth. The DDoS device may be operable to protect upstream data communications during the DDoS attack. Furthermore, the DDoS device may be operable to perform a primary signaling of the DDoS attack via a primary signaling channel. The mobile device coupled to the DDoS device may be operable to signal the DDoS attack via a mobile signaling channel. The mobile signaling channel may include one or more of the following: a cellular communication channel, a satellite communication channel, and so forth.

Upon coupling the mobile device to the DDoS device, the method 200 may continue with determining, at operation 204, that a capacity of the primary signaling channel associated with the DDoS device is below a predetermined threshold capacity. In an example embodiment, the predetermined threshold capacity is measured in data packets per unit of time.

Based on the determination, signaling of the DDoS attack by the mobile device may be activated at operation 206. The mobile device may signal the DDoS attack via the mobile signaling channel. In some example embodiments, signaling of the DDoS attack via the mobile signaling channel is used in tandem with the primary signaling of the DDoS attack via the primary signaling channel.

In some example embodiments, the signaling notifies a TPS of the DDoS attack in progress. The TPS may include customer premise equipment installed at a customer site. Furthermore, the TPS may include a cloud-based system. In response to the received signal of the DDoS attack in progress, at least one DDoS protective measure may be triggered. The DDoS protective measures may be performed by the TPS.

In some embodiments, the DDoS protective measures include passing data packets addressed to the attacked network machine or network resource through traffic filters to identify incoming data packets and separate human traffic from traffic initiated by human-like bots. In some embodiments, such operations may be done by comparing signatures and examining different attributes of the data packets, including IP addresses, cookie variations, Hypertext Transfer Protocol headers, JavaScript footprints, and so forth. Additionally, the TPS may perform one or more of the following operations: dropping the malicious packets, resetting the connection and/or blocking the data packets from the offending IP address, unfragmenting data packet streams, and so forth.

Figure 3:
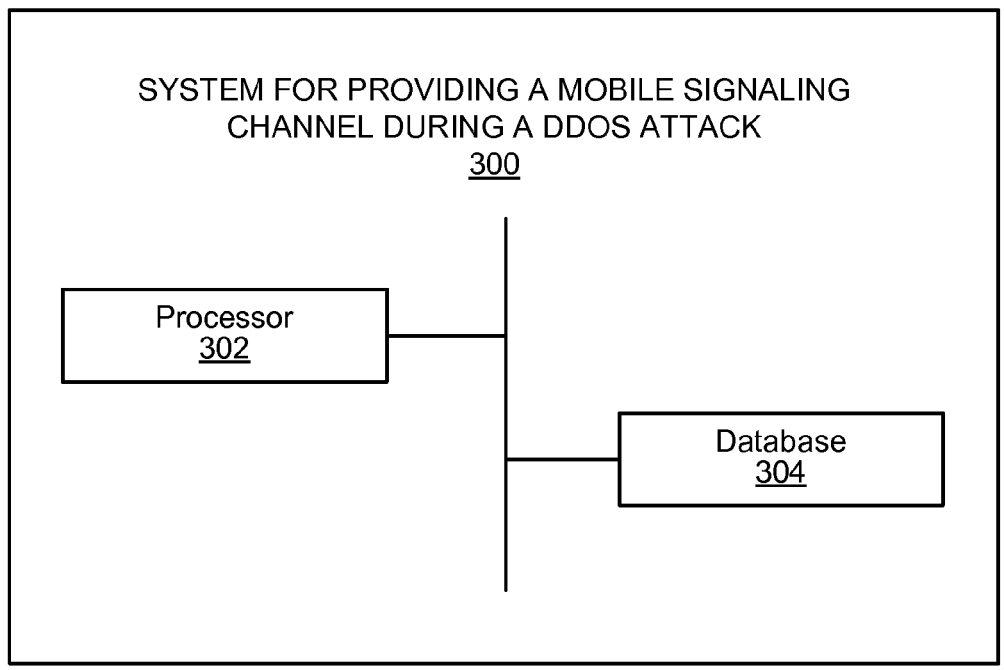
FIG. 3 is a block diagram of a system for providing a mobile signaling channel during a DDoS attack.

FIG. 3 shows a block diagram illustrating various modules of an example system 300 for providing a mobile signaling channel during a DDoS attack. Specifically, the system 300 may include at least one processor 302. The processor 302 may be operable to communicatively couple a mobile device to a DDoS device protecting upstream data communications during the DDoS attack. The mobile device may be communicatively coupled to the DDoS device through at least one of the following: a wireless connection, a USB connection, a PCI connection, and so forth. The DDoS device may be operable to perform a primary signaling of the DDoS attack via a primary signaling channel. The mobile device may be operable to signal the DDoS attack via a mobile signaling channel. In some example embodiments, the mobile signaling channel includes one or more of the following: a cellular communication channel, a satellite communication channel, and so forth.

The processor 302 may be further operable to determine that a capacity of the primary signaling channel associated with the DDoS device is below a predetermined threshold capacity. The predetermined threshold capacity may be measured in data packets per unit of time.

Based on the determination, the processor 302 may activate signaling of the DDoS attack by the mobile device via the mobile signaling channel. In some example embodiments, the signaling of the DDoS attack via the mobile signaling channel is used in tandem with the primary signaling of the DDoS attack via the primary signaling channel.

In further example embodiments, the signaling notifies a TPS of the DDoS attack in progress. The TPS may include customer premise equipment installed at a customer site. In some embodiments, the TPS is a cloud-based system.

The processor 302 may be further operable to trigger at least one DDoS protective measure in response to the signaling. The DDoS protective measures may be performed by the TPS.

The system 300 may further comprise a database 304 in communication with the processor 302. The database 304 may store computer-readable instructions for execution by the processor 302.

Figure 4:
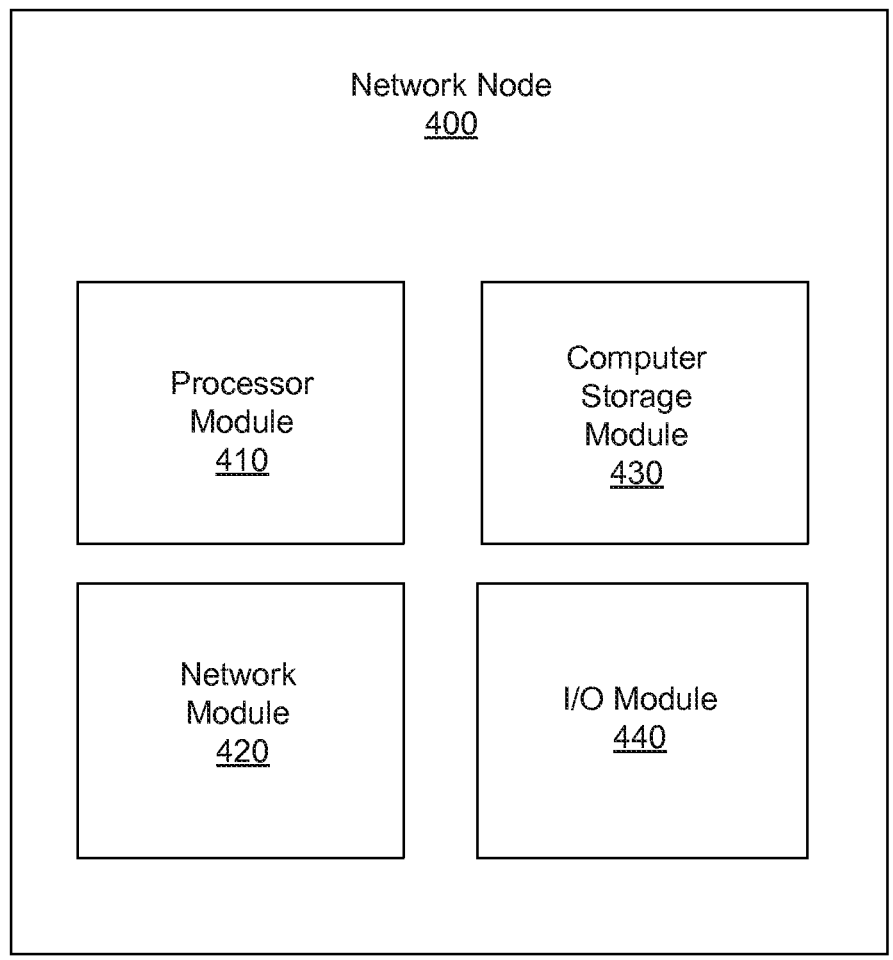
FIG. 4 is a block diagram showing components of a network node.

FIG. 4 illustrates an exemplary embodiment of a network node 400 of a data network. The network node 400 can be a DDoS device, a mobile device, a network machine, or other computing devices associated with the data network. In one embodiment, the network node 400 includes a processor module 410, a network module 420, a computer storage module 430, and an input/output (I/O) module 440. In one embodiment, the processor module 410 includes one or more processors, which may include a micro-processor, an Intel processor, an AMD processor, a MIPS processor, an ARM-based processor, or a RISC processor. The processor module 410 may include one or more processor cores embedded in a processor. In an example embodiment, the processor module 410 includes one or more embedded processors, or embedded processing elements in a Field Programmable Gate Array, an ASIC, or Digital Signal Processor.

The network module 420 may include a network interface, such as Ethernet, an optical network interface, a wireless network interface, T1/T3 interface, a WAN or LAN interface. In one embodiment, the network module 420 includes a network processor. In one embodiment, the computer storage module 430 includes Random-Access Memory (RAM), Dynamic Random Access Memory, Static Random Access Memory, Synchronous Dynamic Random Access Memory, or memory utilized by the processor module 410 or the network module 420.

In one embodiment, the computer storage module 430 stores data utilized by processor module 410. In one embodiment, the computer storage module 430 includes a hard disk drive, a solid state drive, an external disk, a digital video disk (DVD), a compact disk (CD), or a readable external disk. The computer storage module 430 may store one or more computer programming instructions, which, when executed by the processor module 410 or the network module 420, implement one or more of the functionalities of the present disclosure.

In one embodiment, the I/O module 440 includes a keyboard, a keypad, a mouse, a gesture-based input sensor, a microphone, a physical or sensory input peripheral, a display, a speaker, or a physical or sensual output peripheral.

Figure 5:
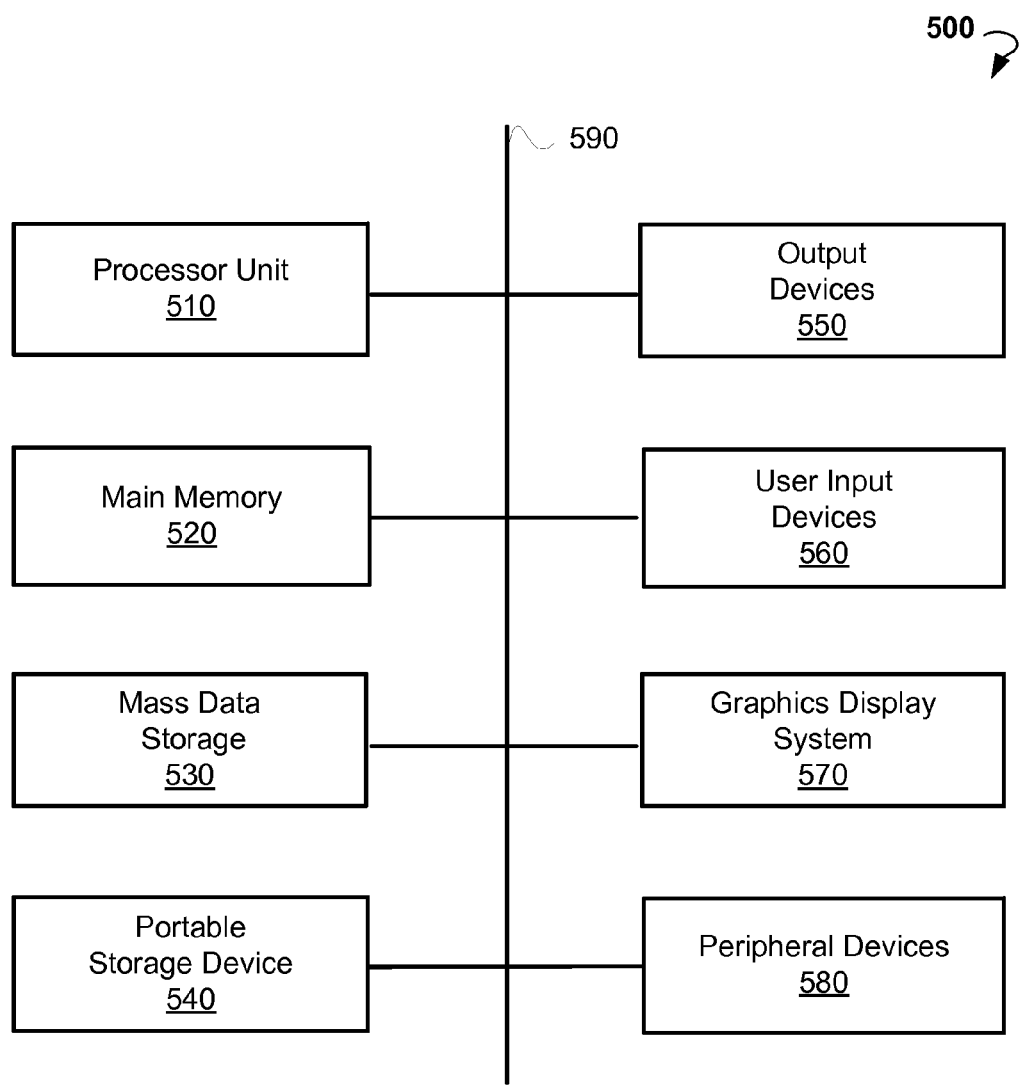
FIG. 5 shows a diagrammatic representation of a computing device for a machine, within which a set of instructions for causing the machine to perform any one or more of the methodologies discussed herein can be executed.

FIG. 5 illustrates an example computer system 500 that may be used to implement embodiments of the present disclosure. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor 510. Main memory 520 stores the executable code when in operation. The computer system 500 further includes a mass data storage 530, portable storage medium drive(s) 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor unit 510 and main memory 520 are connected via a local microprocessor bus, and mass data storage 530, peripheral device(s) 580, portable storage device 540, and graphics display system 570 are connected via one or more I/O buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a floppy disk, CD, DVD, or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used, including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media, such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for providing a mobile signaling channel during a DDoS attack have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing a mobile signaling channel during a Distributed Denial of Service (DDoS) attack on a network machine or a network resource, the method comprising:

determining, by a processor, whether a capacity of a primary signaling channel associated with a DDoS device protecting upstream data communications in a communication network serving the network machine or the network resource is below a predetermined threshold capacity, wherein the predetermined threshold capacity is measured in data packets per unit of time or throughput;

based on a determination that the capacity of the primary signaling channel associated with the DDoS device is below the predetermined threshold capacity, determining, by the processor, that the DDoS device is unavailable to signal, via the primary signaling channel, that a DDoS attack directed to the network machine or the network resource is in progress;

based on unavailability of the DDoS device to signal the DDoS attack via the primary signaling channel, activating, by the processor, a secondary signaling channel for the DDoS device, the secondary signaling channel being a mobile signaling channel provided using a mobile device communicatively coupled to the DDoS device;

sending, by the mobile device, notification of the DDoS attack to a Threat Protection System (TPS) via the secondary signaling channel; and in response to the sending of the notification, triggering, by the Threat Protection System, at least one DDoS protective measure, wherein the at least one DDoS protective measure includes at least one of passing data packets addressed to one of an attacked network machine and an attacked network resource through traffic filters, dropping a malicious data packet, resetting a connection, blocking a data packet received from an offending Internet Protocol address, and unfragmenting data packet streams.

2. The method of claim 1, wherein the mobile device is communicatively coupled to the DDoS device through at least one of the following: a wireless connection, a Universal Serial Bus (USB) connection, and a Peripheral Component Interconnect (PCI) connection.

3. The method of claim 1, wherein the sending notification of the DDoS attack to the Threat Protection System is via the primary signaling channel.

4. The method of claim 1, wherein the sending notification of the DDoS attack via the mobile signaling channel is in tandem with a primary sending notification of the DDoS attack via the primary signaling channel.

5. The method of claim 1, wherein the sending notification indicates to the Threat Protection System (TPS) that the DDoS attack is in progress.

6. The method of claim 5, wherein the TPS includes customer premise equipment installed at a customer site.

7. The method of claim 5, wherein the TPS includes a cloud-based system.

8. The method of claim 1, wherein the mobile signaling channel includes at least one of the following: a cellular communication channel and a satellite communication channel.

9. A system for providing a mobile signaling channel during a Distributed Denial of Service (DDoS) attack on a network machine or a network resource, the system comprising:

a hardware processor; and
a memory communicatively coupled to the processor; the memory storing instructions executable by the processor to:

determine whether a capacity of a primary signaling channel associated with a DDoS device protecting upstream data communications in a communication network serving the network machine or the network resource is below a predetermined threshold capacity, wherein the predetermined threshold capacity is measured in data packets per unit of time or throughput;

based on a determination that the capacity of the primary signaling channel associated with the DDoS device is below the predetermined threshold capacity, determining that the DDoS device is unavailable to signal, via the primary signaling channel, that a DDoS attack directed to the network machine or the network resource is in progress;

based on unavailability of the DDoS device to signal the DDoS attack via the primary signaling channel, activate a secondary signaling channel for the DDoS device, the secondary signaling channel being a mobile signaling channel provided using a mobile device communicatively coupled to the DDoS device;

send notification of the DDoS attack to a Threat Protection System (TPS) via the secondary signaling channel; and in response to the sending of the notification, trigger, by the Threat Protection System, at least one DDoS protective measure, wherein the at least one DDoS protective measure includes at least one of passing data packets addressed to one of an attacked network machine and an attacked network resource through traffic filters, dropping a malicious data packet, resetting a connection, blocking a data packet received from an offending Internet Protocol address, and unfragmenting data packet streams.

10. The system of claim 9, wherein the mobile device is communicatively coupled to the DDoS device through at least one of the following: a wireless connection, a USB connection, and a PCI connection.

11. The system of claim 9, wherein the sending notification of the DDoS attack via the mobile signaling channel is in tandem with a primary signaling of the DDoS attack via the primary signaling channel.

12. The system of claim 9, wherein the sending notification indicates to the Threat Protection System (TPS) that the DDoS attack is in progress.

13. The system of claim 12, wherein the TPS includes customer premise equipment installed at a customer site.

14. The system of claim 12, wherein the TPS includes a cloud-based system.

15. The system of claim 9, wherein the mobile signaling channel includes one or more of the following: a cellular communication channel and a satellite communication channel.

16. A non-transitory processor-readable medium having embodied thereon a program being executable by at least one processor to perform a method for providing a mobile signaling channel during a Distributed Denial of Service (DDoS) attack on a network machine or a network resource, the method comprising:

determining, by a processor, whether a capacity of a primary signaling channel associated with a DDoS device protecting upstream data communications in a communication network serving the network machine or the network resource is below a predetermined threshold capacity, wherein the predetermined threshold capacity is measured in data packets per unit of time or throughput;

based on a determination that the capacity of the primary signaling channel associated with the DDoS device is below the predetermined threshold capacity, determining, by the processor, that the DDoS device is unavailable to signal, via the primary signaling channel, that a DDoS attack directed to the network machine or the network resource is in progress based on unavailability of the DDoS device to signal the DDoS attack via the primary signaling channel, activating, by the processor, a secondary signaling channel for the DDoS device, the secondary signaling channel being a mobile signaling channel provided using a mobile device communicatively coupled to the DDoS device;

sending, by the mobile device, notification of the DDoS attack to a threat protection system via the secondary signaling channel; and in response to the sending of the notification, triggering, by the Threat Protection System, at least one DDoS protective measure, wherein the at least one DDoS protective measure includes at least one of passing data packets addressed to one of an attacked network machine and an attacked network resource through traffic filters, dropping a malicious data packet, resetting a connection, blocking a data packet received from an offending Internet Protocol address, and unfragmenting data packet streams.

* * * * *